United States Patent [19]

Bridges

[11] 4,204,629
[45] May 27, 1980

[54] BRUSH SEAL AND A METHOD OF MANUFACTURE

[75] Inventor: Stuart A. Bridges, Bristol, England

[73] Assignee: Rolls-Royce Limited, London, England

[21] Appl. No.: 922,522

[22] Filed: Jul. 7, 1978

[30] Foreign Application Priority Data

Jul. 20, 1977 [GB] United Kingdom ............... 30391/77

[51] Int. Cl.² ........................ B23K 31/02; F16J 15/48
[52] U.S. Cl. .................................... 228/160; 228/178; 300/21; 277/53
[58] Field of Search ................... 228/159, 160, 173 E, 228/178; 300/21; 277/53, 55–57, 95, 227, 235

[56] References Cited

U.S. PATENT DOCUMENTS

| 2,449,668 | 9/1948 | Peterson | 300/21 |
| 2,634,167 | 4/1953 | Bible, Jr. | 300/21 |
| 2,878,048 | 3/1959 | Peterson | 277/227 |
| 3,917,150 | 11/1975 | Ferguson et al. | 228/159 |

Primary Examiner—Francis S. Husar
Assistant Examiner—K. J. Ramsey
Attorney, Agent, or Firm—Stevens, Davis, Miller & Mosher

[57] ABSTRACT

A method of manufacture of a brush for use as a seal includes the steps of winding a filament or filaments of bristle material onto a mandrel which carries on each side thereof a side-plate of the brush so that the bristle material overlies an exposed face of each side-plate at an angle of 45°. After winding, a second side-plate is made to overlie the bristle material to sandwich it between the two plates and the side-plates and bristle material are welded or fused together at one edge thereof. The bristle material is then cut and the plates removed from the mandrel to produce two brushes with bristles projecting from the other edge at an angle.

7 Claims, 7 Drawing Figures

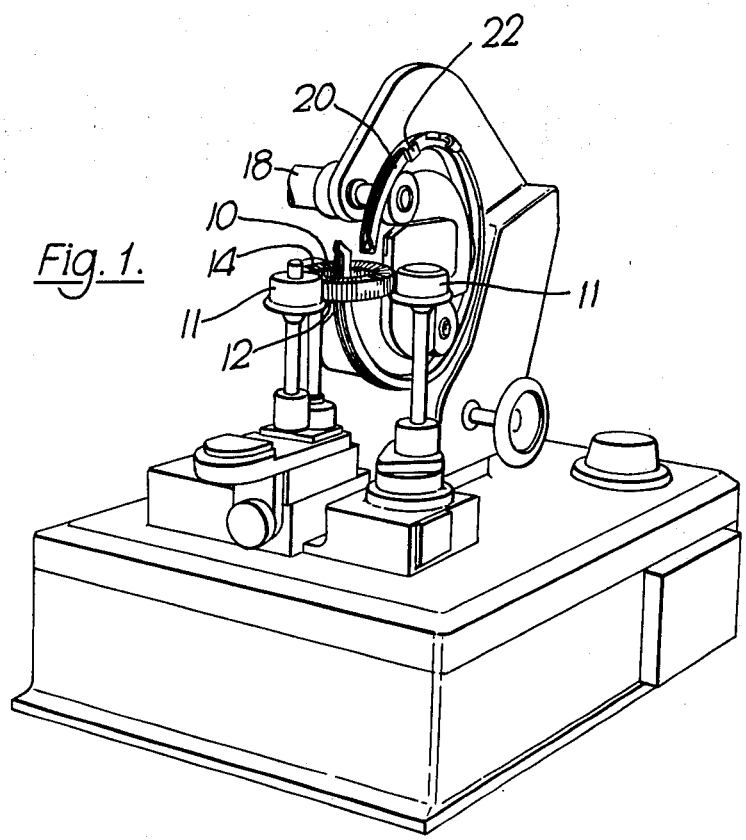
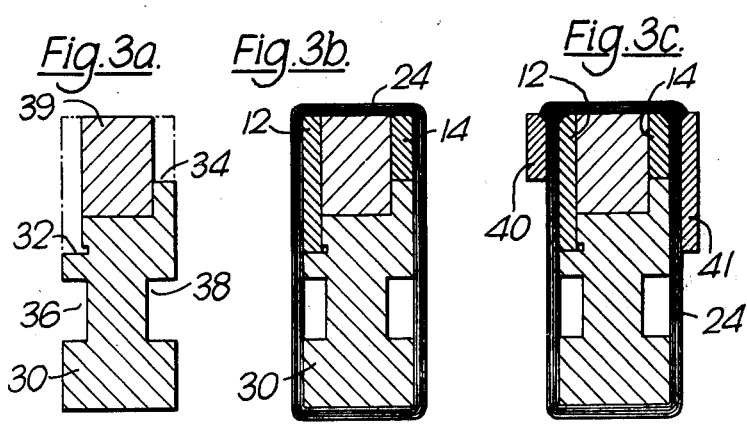
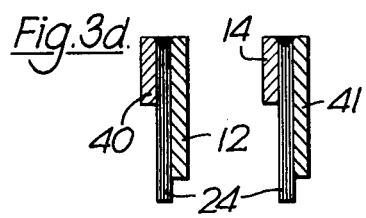

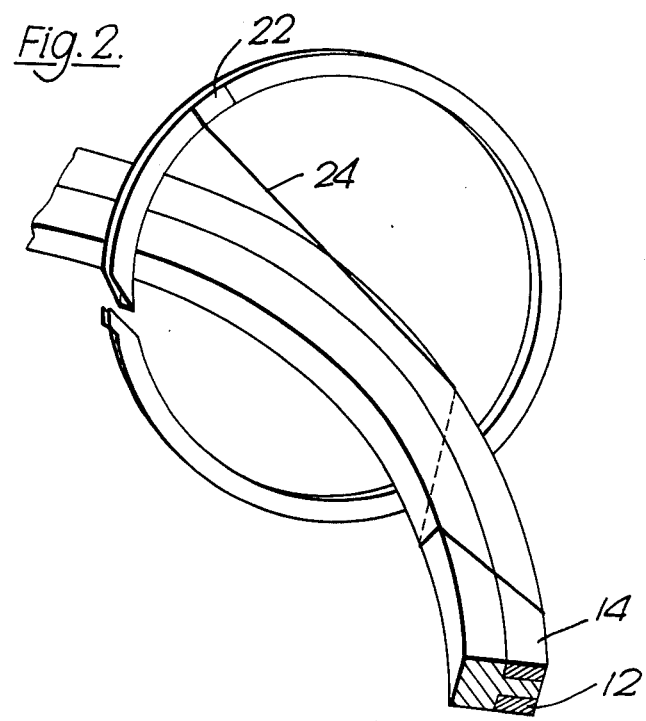
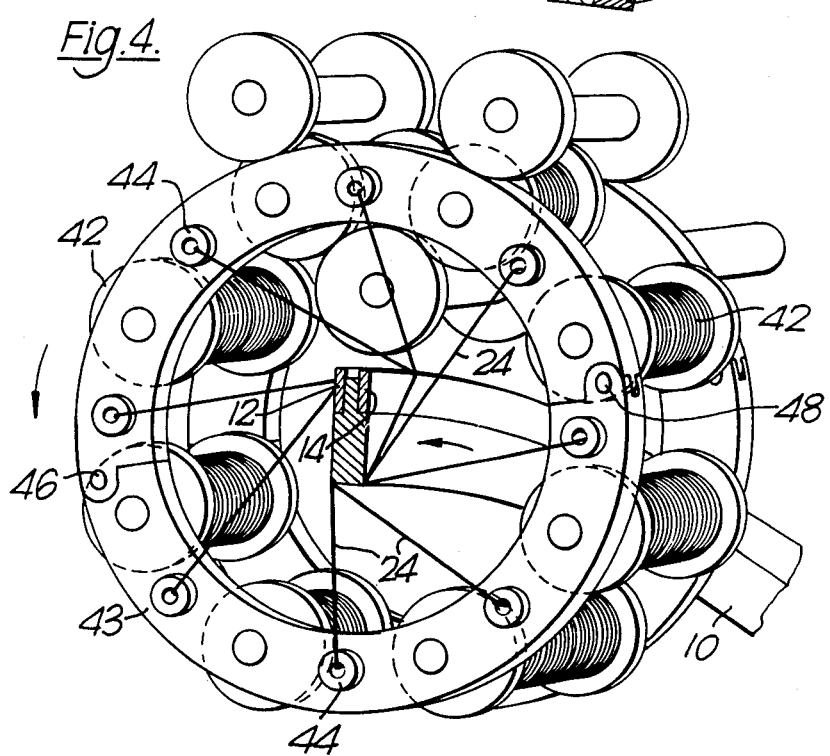

BRUSH SEAL AND A METHOD OF MANUFACTURE

The present invention relates to brushes, which may be used as seals, and to a method of manufacture thereof.

In our U.K. Pat. No. 1,450,553, there is described and claimed a brush seal which comprises a pair of side-plates between which a plurality of brush bristles are held and from which they project freely from one or other of the edges. The bristles are integrally joined to the side-plates by welding or brazing or other suitable methods.

These brush seals are made by a method which includes the steps, inter alia, of first forming a brush by tufting the bristles into a backing ring, clamping the projecting bristles between the side-plates and integrally joining them to the side-plates before removing the backing ring.

This method, while producing adequate seals, has the disadvantage of including the initial step of tufting the bristles into a backing ring which is subsequently removed. This step clearly adds to the cost of the seal.

The object of the present invention is to provide a method of manufacture of a brush suitable for use as a seal, and which avoids this disadvantage.

According to the present invention a method of manufacture of a brush comprises steps of:

mounting a first side-plate of the seal on a mandrel;

winding at least one continuous filament, of bristle material onto the side-plate in such a manner that the material lies across an exposed face of the side-plate;

positioning a further side-plate to overlie the bristle material on the face of the first side-plate, thus sandwiching the bristle material between the two side-plates, leaving some bristle material projecting from one edge of the side-plate pair;

integrally joining the bristle material to the side-plate pair between which it is trapped at the outer edge thereof; and cutting the bristle material, and removing the side-plates from the mandrel.

The side-plates may be supported in pairs on the mandrel and may be held in spaced apart relationship or in contact with each other, and the mandrel may be straight, arcuate or completely annular to produce similarly shaped seals.

The winding operation may be carried out on a conventional toroidal or spiral winding machine, in which an annular filament carrier is mounted for rotation in rollers and the article to be wound, also supported in rollers, passes through the carrier. The speeds of rotation of the filament carrier and the article to be wound are adjusted by a gear connection.

In one embodiment of the invention a pair of side-plates are mounted back-to-back on a mandrel and are wound on a toroidal winding machine using a single filament carrier. Alternatively, the winding machine may include a plurality of filament carriers.

The side-plates may be positioned on the mandrel to produce inwardly or outwardly facing bristles in the completed brush, and more than one pair of side-plates may be carried by the mandrel and simultaneously wound with bristle filaments.

Preferably a tensioning device is provided for each filament of bristle material to be wound, which may be a spring device for frictionally retarding the speed of the winding device.

An embodiment of the invention in which brush seals are made will now be more particularly described, merely be way of example, with reference to the accompanying drawings in which:

FIG. 1 illustrates pictorially an annular mandrel being wound by an annular filament carrier on a conventional toroidal winding machine;

FIG. 2 is an enlarged view of the mandrel being wound showing the angle of the wound bristle filament;

FIGS. 3a to 3d show sections through a mandrel during various stages of the process; and FIG. 4 illustrates an alternative winding process.

Referring now to FIG. 1 of the drawings there is shown a conventional toroidal winding machine which may be of the kind supplied by Herbert Ruff KG of Munich. An annular mandrel 10 is mounted for rotation in rollers 11 and carries a pair of annular side-plates 12,14 on its side faces adjacent its radially outer periphery. The mandrel is arranged to pass through an annular filament carrier 20 which is channel-shaped and on which is wound a continuous filament 24 of a metallic bristle material. The filament carrier 20 is supported for rotation in a plurality of rollers 16, one of which is connected to a drive shaft 18 for rotating the spool carrier, and a similar driving arrangement (not shown) is used for driving rollers 11 supporting the mandrel 10. Thus rotation of the mandrel and the filament carrier causes a filament of bristle material to be continuously supplied from the filament carrier 20, via a slider 22 which tensions the filaments, and wound onto the mandrel to overlie the outer side surfaces of the side-plates 12,14.

Clearly by varying the relative speeds of rotation of the mandrel and the filament carrier the bristle filament can be arranged to lie at any desired angle on the side-plates as shown in FIG. 2.

In FIG. 2 the pitch between windings of the filaments is wide resulting in the same angle of lay of the bristles which ever side the mandrel is viewed from. This can be achieved by a relatively high relative rotational speed between the mandrel and the filament carrier. By putting identical side-plates on the mandrel therefore, an identical pair of brush seals can be produced.

As an alternative however, the relative speed of the mandrel can be reduced so that the windings thereon lie close together. Then as viewed from opposite sides of the mandrel the windings will have opposite inclinations. By this means opposite handled seals may be produced in which case, as shown in FIGS. 3a to 3d where the side-plates of the seal are to be of different radial depth, one side-plate of each size is mounted on the mandrel back-to-back.

FIGS. 3a to 3d show the steps of the process for making a seal by the method.

The mandrel 10 is shown in FIG. 3a and consists of an annular block 30 of substantially rectangular cross-section and having cutouts at 32 and 34 at its radially outer periphery for receiving the side-plates 12,14. Further recesses 36 and 38 are provided in the side faces of the mandrel to allow for the bristle material to be cut without de-facing the mandrel so that the mandrel can be reused.

A metallic chill block 39 is carried at its radially outer periphery, which lies between the side-plates and serves to conduct welding heat from the side-plates during the process of joining the bristle material to the side-plates.

FIG. 3b shows the mandrel with the side-plates in position and the bristle material wound over the whole assembly. The side-plates may be attached to the mandrel by glueing or by being a press fit.

FIG. 3c shows the positioning of a second pair of plates 40 and 41 to overlie the bristle material, and the welding of the bristle material to these plates at their radially outer edge.

FIG. 3d illustrates the finished seal which is produced after the bristle material has been cut through at the recesses 36 and 38, and the free bristle ends and the weld material have been trimmed to finished size.

The angle of the bristles is preferably of the order of 45° which allows the bristles to rub with minimum wear on a rotating component. The seals are mounted in use with the bristles angled in the direction of rotation of the component.

FIG. 4 illustrates an alternative winding mechanism which uses multiple filaments for speeding up the winding process. In this embodiment the filament carrier is roller driven and has eight spools 42 mounted on a spool carrier 43, each spool feeds a filament onto the mandrel.

The filaments from the spools 42 are passed through holes 44 in one of the side-plates of the spool carrier 43 to ensure that they always emerge in the same plane to avoid variations in the winding angle as the spools unwind.

The spool carrier is hinged at 46 and latched at 48 to enable the annular mandrel to pass through the inside thereof.

Although friction drives are illustrated, clearly gears could be substituted for one or more of the rollers shown or provided in addition thereto, and surfaces of the mandrel and spool carrier can be provided with teeth for providing a positive gear drive.

Depending on the sizes of the mandrel and the spool carrier additional supporting rollers may be positioned at suitable positions around their circumferences.

The widths of the side-plates may be different as shown in FIG. 3d to give greater bristle flexibility with maximum support in one direction during use, or one face of one of the side-plates may be slightly recessed at the radially inner edge to reduce the contact length of the bristles with the side-plate on one side.

The side-plates may be arranged along with the recesses 36,38 in the mandrel to provide for radially outwardly facing bristles, and more than one pair of side-plates may be carried on the mandrel.

The side-plates have been shown mounted back to back and axially spaced apart, but they may be mounted back to back with faces in contact on an annular support ring, so that a less expensive mandrel may be used, and a double seal with oppositely inclined bristles on each side can be made. Alternatively, only one side-plate may be mounted on the mandrel.

Metallic bristle filaments have been described and a preferred material for high temperature use is a Nickel alloy sold under the trade name of NIMONIC 90. The bristles, once wound, are heat-treated briefly to remove any tendency for them to curl up in the finished seal. However, non-metallic bristles may be used, e.g. plastic or fibre-reinforced plastic for low temperature applications, or even carbon fibres for high temperature applications. Such materials would be resin-bonded to the side-plates at one radial extremity thereof.

The mandrel may be straight or arcuate depending on the shape of seal required.

To maintain a constant tension and avoid variation in angular disposition of the filaments, on the mandrel, other forms of tensioning devices may be attached to each spool, e.g. a spring in frictional contact with the spool, to provide some drag on its rotation and thus a tension in the filament.

I claim:

1. A method of manufacture of a brush comprises the steps of:
   mounting a first side-plate of rigid material on a mandrel;
   winding at least one continuous filament of bristle material onto the side-plate in such a manner that the material lies across an exposed face of the side-plate;
   positioning a further side-plate of rigid material to overlie the bristle material on the face of the first side-plate thus sandwiching the bristle material between the two side-plates, leaving some bristle material projecting from one edge of the side-plate pair;
   integrally joining the bristle material to the side-plate pair between which it is trapped at the other edge thereof; and
   cutting the bristle material and removing the side-plates from the mandrel.

2. A method of manufacture of a brush according to claim 1 and wherein the bristle material is built up on the mandrel by winding a single filament in a multiplicity of turns.

3. A method of manufacture of a brush according to claim 1 and wherein the bristle material is built up on the mandrel by winding a plurality of filaments in a multiplicity of turns.

4. A method of manufacture of a brush seal according to claim 1 and wherein the side-plates are annular and the bristle material is arranged during the winding process to lie across the face of the side-plates at an angle to the radius of the side-plates.

5. A method of manufacture of a brush seal according to claim 4 and wherein the bristle material is carried during the winding process on an annular filament carrier through which the annular mandrel is looped, both the mandrel and the filament carrier being supported for rotation to wind the bristle filament from the carrier onto the mandrel, the relative speeds of rotation of the mandrel and the filament carrier being adjusted to produce the appropriate angle of the lay of the bristle material on the side-plates.

6. A method of manufacture of a brush seal according to claim 5 and wherein the relative speeds of rotation of the mandrel and the bristle carrier are such that a wide pitch spacing of the filament windings is produced so that the angle of the bristle lay when viewed from opposite sides of the mandrel is the same.

7. A method of manufacture of a brush seal according to claim 5 and in which the relative speeds of rotation of the mandrel and the filament carrier are such that a close pitch spacing of the filament winding is produced so that the angle of the bristle lay when viewed from opposite sides of the mandrel is opposite.

* * * * *